US006485040B1

United States Patent
Dudding

(10) Patent No.: US 6,485,040 B1
(45) Date of Patent: *Nov. 26, 2002

(54) SINGLE ROTATION POINT ATTACHMENT PART FOR LEAF SPRINGS

(75) Inventor: Ashley T. Dudding, Plainfield, IL (US)

(73) Assignee: The Boler Company, Itasca, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,867

(22) Filed: Sep. 8, 2000

Related U.S. Application Data

(63) Continuation-in-part of application No. 09/040,570, filed on Mar. 18, 1998, now Pat. No. 6,129,369.

(51) Int. Cl.$^7$ .......................... B60G 11/12; B60G 11/46
(52) U.S. Cl. ..................... 280/124.175; 280/124.163; 267/270
(58) Field of Search ................... 280/124.17, 124.175, 280/124.176, 686, 680, 124.163; 267/260, 261, 263, 269, 270, 271, 281

(56) References Cited

U.S. PATENT DOCUMENTS

| | | | |
|---|---|---|---|
| 3,508,745 A | * | 4/1970 | Deane |
| 4,175,756 A | * | 11/1979 | Denton et al. |
| 4,718,693 A | * | 1/1988 | Booher |
| 6,129,369 A | * | 10/2000 | Dudding |

FOREIGN PATENT DOCUMENTS

EP 0 752 934 B1 1/1997

* cited by examiner

Primary Examiner—Paul N. Dickson
Assistant Examiner—Ruth Ilan
(74) Attorney, Agent, or Firm—Cook, Alex, McFarron, Manzo, Cummings & Mehler, Ltd.

(57) ABSTRACT

A suspension system incldes first and second frame hangers mounted to the supported frame member. A single-leaf proximal end. The eye is pivotally connected to the frame member at the first frame hanger and the distal end portion of the leaf spring is connected to the frame member at the second frame hanger. A leaf spring attachment part mounts to the distal end portion of the leaf spring and connects it with the second frame hanger. The leaf spring attachment part includes a sleeve having an axially extending bore. The sleeve is sized and shaped to accommodate a rod, such as a pin or pivot bolt, to connect the distal end portion of the leaf spring and the leaf spring attachment part with the second frame hanger. When it is so connected, the leaf spring attachment part restricts the movement of the leaf spring to be controlled range. The pin or pivot bolt lies coincident with an axis defining the natural center of rotation for the distal end portion of the leaf spring to permit natural movement of that distal end portion during jounce and rebound action of the associated axle. A thrust washer is secured to the leaf spring attachment member to absorb lateral forces and prevent wear of the second frame hanger.

21 Claims, 4 Drawing Sheets

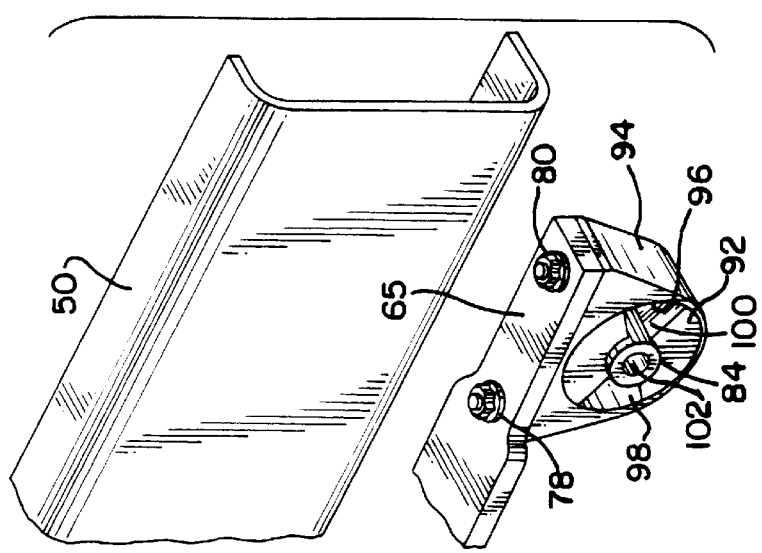
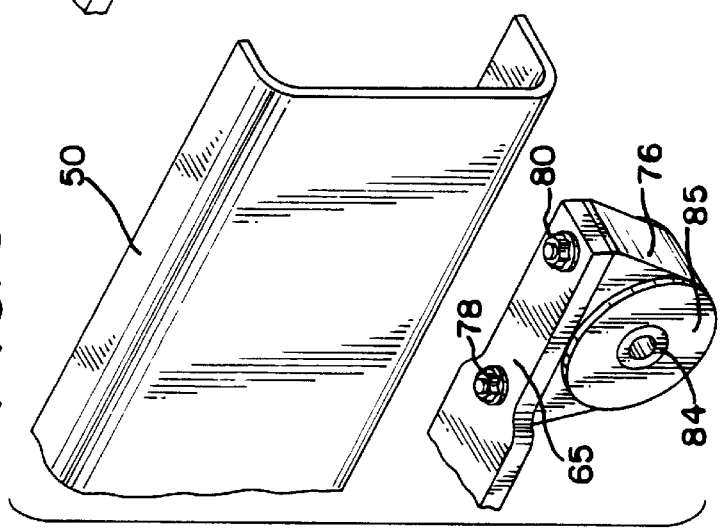
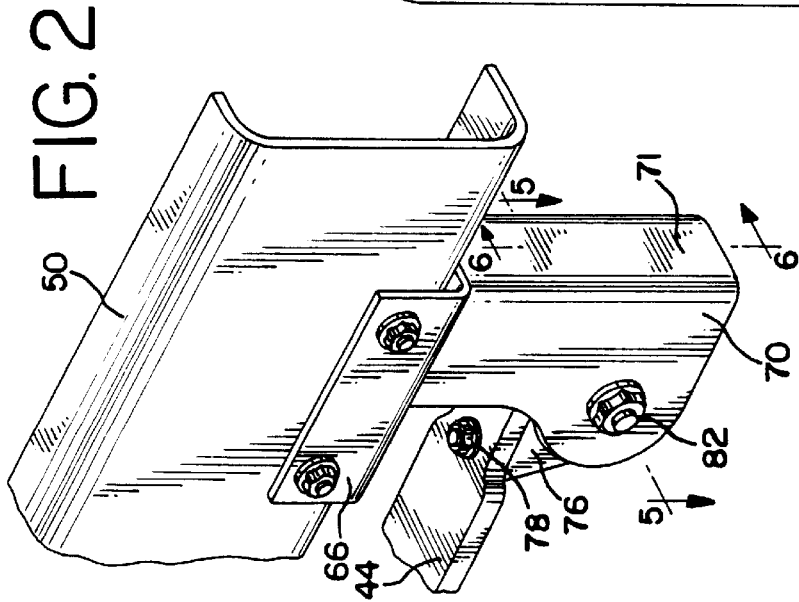

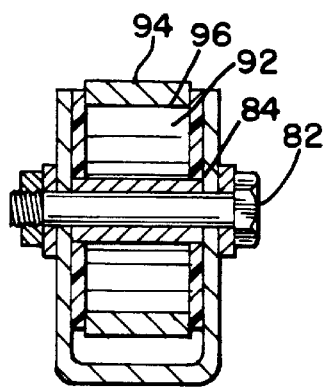
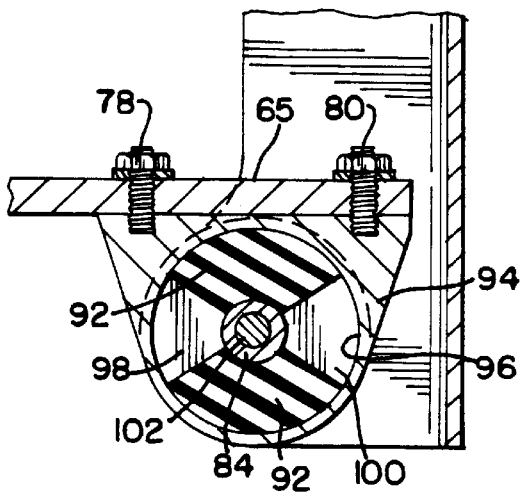
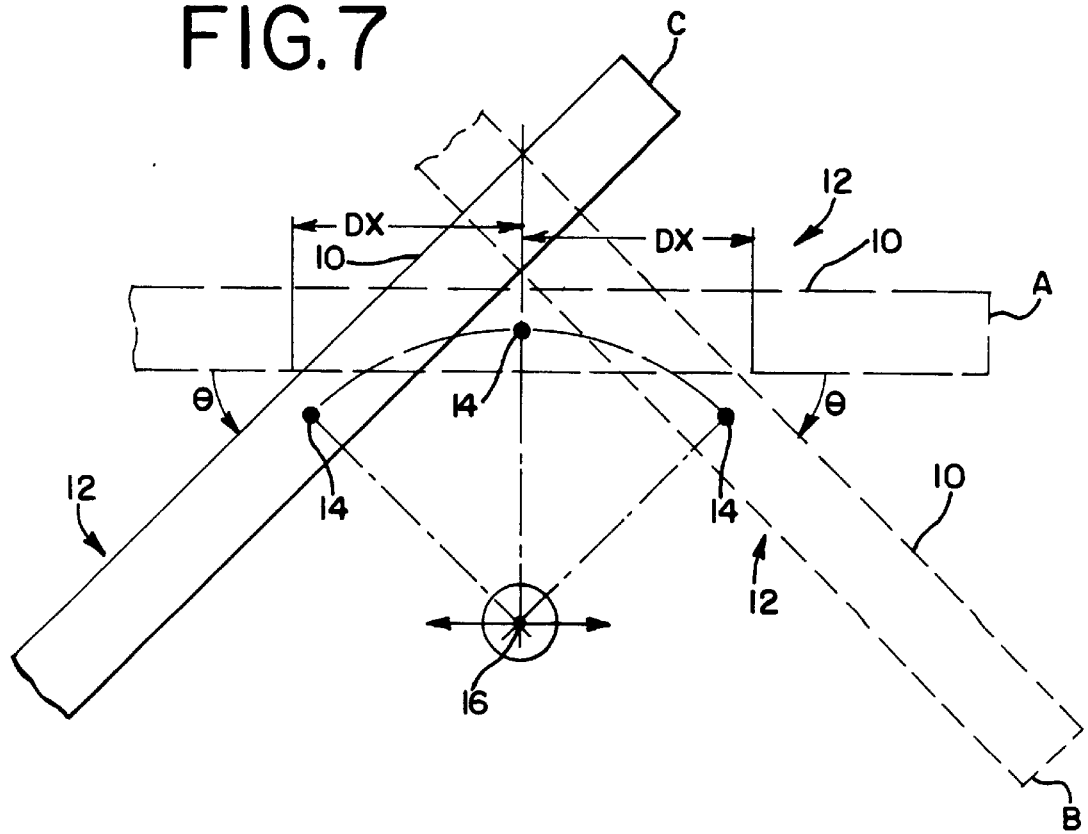

SINGLE ROTATION POINT ATTACHMENT PART FOR LEAF SPRINGS

CROSS-REFERENCE to RELATED APPLICATION

This application is a continuation-in-part of pending U.S. Ser. No. 09/040,570, filed Mar. 18, 1998, now U.S. Pat. No. 6,129,369 naming Ashley T. Dudding as inventor, the full disclosure of which is hereby incorporated herein by reference.

BACKGROUND of the INVENTION

Thisinvention relates to innovations and improvements in axle suspensions for trucks and trailers and in certain component parts of such suspensions. More particularly, the invention relates to such suspensions wherein a leaf spring, such as a single-leaf leaf spring, has an eye formation at its proximal end by which it is pivotally connected to a hanger on its proximal side of a chassis side rail or frame member while the distal end portion of the leaf spring is connected to a hanger on the opposing side of the frame member by a new and improved attachment part. The new and improved attachment part permits play or movement of the distal end portion of the leaf spring about its natural instant center of rotation produced by the fore-and-aft movement of the spring and its angle of rotation due to deflection. At the same time, the new and improved attachment part anchors the distal end portion of the leaf spring to its associated frame hanger in the event the pivotal connection at the proximal end becomes broken or unattached. Intermediate its opposite ends, the leaf spring is mounted on the adjacent end of the axle and it optionally supports an air cushion or air bag which may provide a substantial portion of the support for the chassis.

One advantage of the suspension of this invention is the omission of an additional leaf having a so-called "military wrap" formation that embraces the spring eye end of the leaf spring. This omission is permissible since, even with the spring eye freed or detached from its frame hanger, the opposite end of the single-leaf leaf spring is connected to its associated frame hanger in a sufficiently secure manner so that the end of the axle on which the leaf spring is mounted will not become loose and/or uncontrolled while the vehicle is brought to a safe stop.

In view of the foregoing, it is a principal object of the present invention to provide a novel component part of a suspension system whereby the movement of the distal end portion of the leaf spring on which it is mounted is permitted to pivot about its natural instant center of rotation during jounce and rebound of the axle on which the leaf spring is mounted.

It is another object of the present invention to provide an attachment part that creates a single point of rotation for the distal end portion of a leaf spring during jounce and rebound of the axle on which the leaf spring is mounted.

It is a further object of the present invention to provide a novel component part of a suspension system which eliminates the spring pin or slipper surface wear associated with those leaf springs having a fore-and-aft extending bearing or contact surface.

It is a further object of the present invention to provide a novel component part of a suspension system which mounts to a leaf spring.

It is yet another object of the present invention to provide a novel component part of a suspension system which serves as an additional safety mechanism for a leaf spring.

It is yet another object of the present invention to provide a novel component part of a suspension system which enables the leaf spring on which it is mounted to be free of a military wrap.

It is still another object of the present invention to provide a novel component part of a suspension system which enables the system to include a single-leaf leaf spring on each side of the vehicle for supporting that side of the vehicle axle.

It is yet another object of the present invention to provide a novel component part of a suspension system which enables the suspension system to comprise a lighter-weight suspension system.

It is finally another object of the present invention to provide a novel component part of a suspension system which reduces the manufacturing and maintenance costs of the system by eliminating the need for otherwise necessary parts and points of rotation thereof.

These and other objects of the invention will be apparent to those skilled in the art from the following detailed description of the preferred embodiment taken in conjunction with the accompanying drawings wherein:

BRIEF DESCRIPTION OF THE DRAWINGS

FIG. 2 is a fragmentary isometric view of the suspension system of FIG. 1, focusing on the connection of the novel component part of the present invention with the frame member of the vehicle;

FIG. 3 is an isometric view of the novel component part of the present invention, shown mounted to a single-leaf leaf spring and having a thrust washer secured thereto;

FIG. 4 is an isometric view of the novel component part of the present invention, shown mounted to a single-leaf leaf spring;

FIG. 5 is a horizontal sectional view of the novel component part shown in FIG. 2 taken along lines 5—5 of FIG. 2;

FIG. 6 is a vertical sectional view of the novel component part shown in FIG. 2 taken along lines 6—6 of FIG. 2;

FIG. 7 is a schematic view showing the distal end portion of a leaf spring as it rotates about its natural instant center of rotation during jounce and rebound of the axle on which the leaf spring is mounted;

DETAILED DESCRIPTION OF THE PREFERRED EMBODIMENTS

Referring first to FIG. 7, a distal end portion 10 of a leaf spring 12 is shown in detail in three different positions. At position A, the distal end portion 10 of leaf spring 12 is shown in the position it assumes when it is subjected to normal axle load and is not deflected. At position B, the distal end portion 10 is shown in the position it assumes when the leaf spring 12 is deflected and subjected to an additional axle load due to jounce of its associated vehicle axle. At position C, the distal end portion 10 is shown in the position it assumes when leaf spring 12 is deflected and subjected to an additional axle load due to rebound of its associated vehicle axle.

The distal end portion 10 of the leaf spring 12 includes a point 14, generally at the mid-portion of the distal end portion, which pivots about an instant center of rotation 16 for the distal end portion. In particular, as the distal end portion 10 freely moves within its range of motion defined at its extremities by positions B and C and at its center by position A, point 14 moves generally along an arc about the instant center of rotation 16 for the distal end portion. These principles form the theory underlying the present invention.

Figure 1:
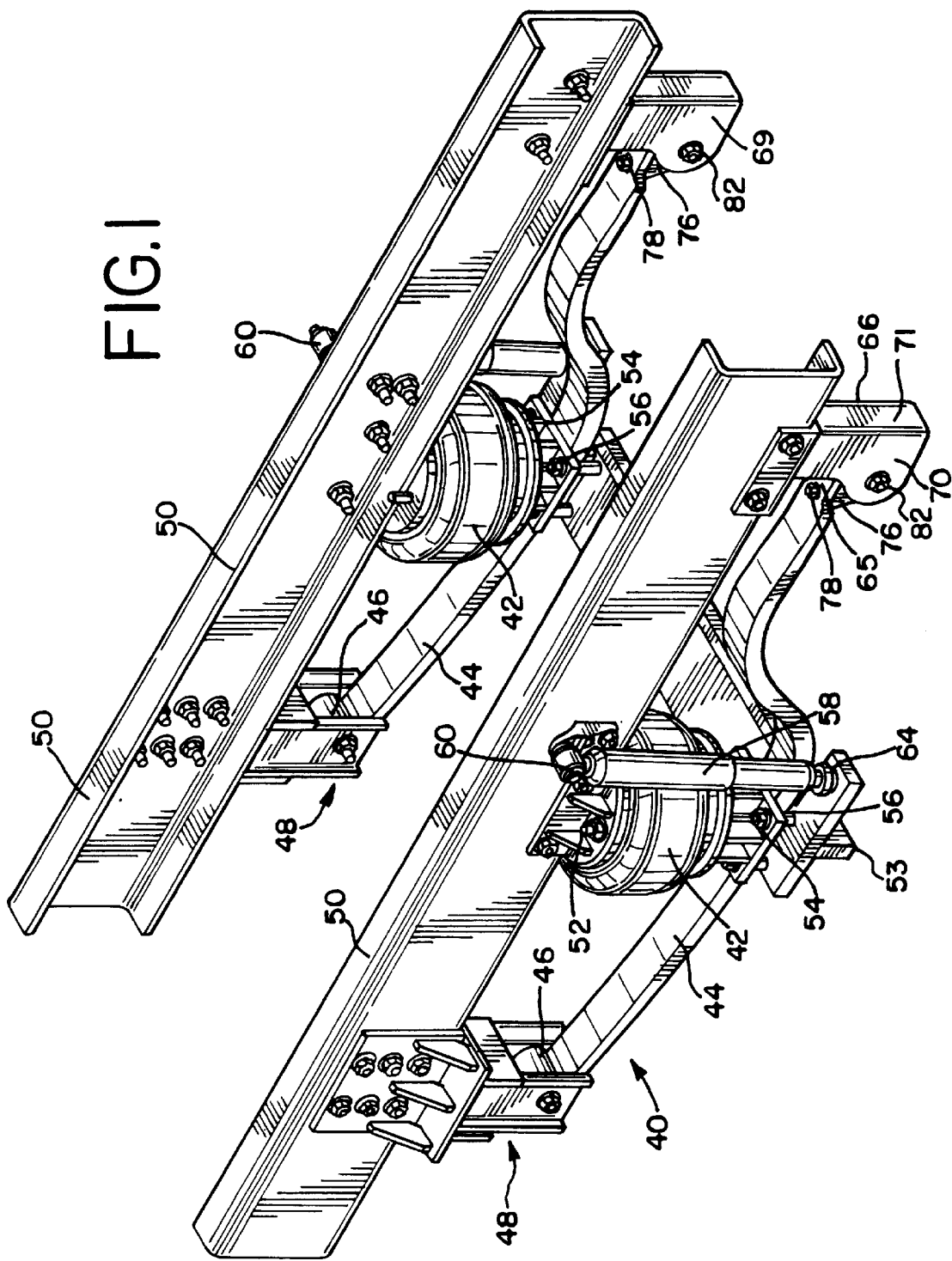
FIG. 1 is an isometric view of a front suspension system for a vehicle such as a light or heavy duty truck wherein the front suspension system includes the novel component part of the present invention.
Figure 8:
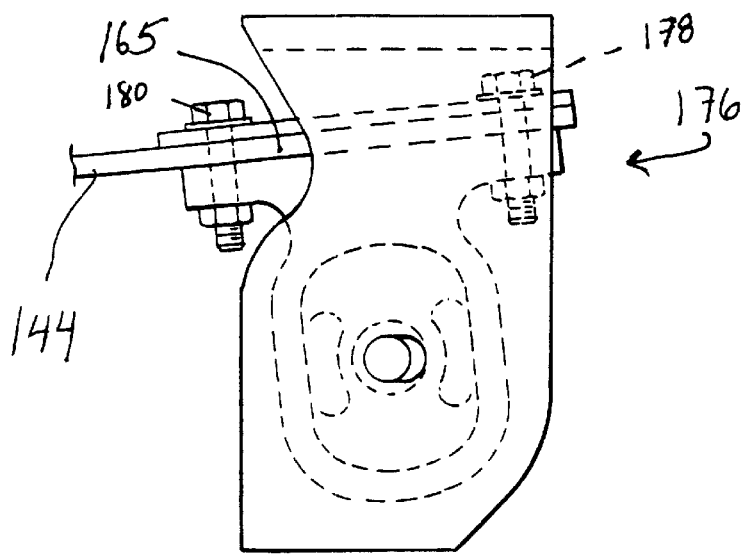
FIG. 8 is a fragmentary elevational view of a suspension system, focusing on the connection of a second embodiment of the novel component part of the present invention with a frame member of a vehicle.

Referring now to FIGS. 1–6, and in particular to FIG. 1, a front suspension system is shown therein and is generally designated by reference number 40. It will be seen and understood that the construction of this suspension system on one side is duplicated on the opposite side of the vehicle. It will further be understood that, although the component part forming the subject matter of the present invention is shown as being within a front suspension system, it could have equal utility when used in rear suspension systems.

The active or functional components of the front suspension system 40 comprise two air springs 42—42 and two single-leaf leaf springs 44—44, which correspond to leaf spring 12 described with reference to FIG. 7. Each singleleaf leaf spring 44 is provided with an eye 46 integrally formed at the proximal end thereof. Each eye 46 is pivotally connected to a standard or existing frame hanger indicated generally by reference numeral 48. As shown, the frame hangers 48 are mounted on each fore-and-aft extending chassis frame member 50.

An upper air spring support bracket 52 is mounted on each chassis frame member 50 at a location that is over one end of the vehicle front axle 53 and over the mid-portion of the single-leaf leaf spring 44 on that side. The top portion of each air spring 42 is attached to its air spring support bracket 52. The underside of each air spring 42 is mounted on an air spring support pad 54 which, in turn, is attached to the axle 53 extending from one side of front suspension system 40 to the other side. As shown, the single-leaf leaf spring 44 extends between the air spring support pad 54 and the axle 53. Typically, the single-leaf leaf spring is attached to the vehicle axle 53 in a known manner by bolts 56—56 and it preferably assumes the form shown and described in U.S. Pat. No. 5,938,221 issued to Wilson on Aug. 17, 1999 and assigned to the assignee of the present invention, the disclosure of which is hereby incorporated herein by reference.

A shock absorber 58 is also included within each side of front suspension system 40. The shock absorber 58 is pivotally connected at its upper end to a bracket 60 mounted on frame member 50 and is attached at its bottom end to axle 53 by a fitting 64.

The distal end portion 65 of each single-leaf leaf spring 44, which corresponds to the distal end portion 10 described with reference to FIG. 7, is operatively connected with frame member 50. A hanger 66 having depending inner, outer and end panels 69, 70, 71, respectively, is mounted to frame member 50. A novel leaf spring attachment part generally designated 76 is fixedly mounted to the distal end portion 65 of each single-leaf leaf spring 44. Two fasteners 78, 80 provide means for mounting the leaf spring attachment part 76 to the single-leaf leaf spring 44 (FIG. 3).

During assembly of the front suspension system 40, the single-leaf leaf spring 44 and its attached attachment part 76 are positioned between the panels 69, 70 of frame hanger 66 to connect a rod shown in the form of a pivot bolt 82 so that it extends along an axis coincident with the natural instant center of rotation 16 for leaf spring 12. The pivot bolt 82 is connected between the panels 69, 70 after it is inserted through the space defined by the bore of a sleeve 84 of the leaf spring attachment part 76.

In view of the above-described arrangement, those skilled in the suspension system art will appreciate that the leaf spring attachment part 76 provides advantages over the prior art systems since the leaf spring attachment member permits the distal end portion 65 of the single-leaf leaf spring 44 to pivot freely, yet controllably, about its natural instant center of rotation.

Further, those skilled in the art will appreciate that use of the leaf spring attachment part 76 in a suspension system provides an additional safety feature and eliminates the practical necessity, based on safety concerns, of using a military wrap. In particular, should the eye 46 at the proximal end of the single-leaf leaf spring 44 become detached from frame hanger 48, the attachment part 76 ensures that the vehicle axle 53 will maintain a secure connection with frame member 50 through the suspension system 40.

Referring now to FIG. 3, a thrust washer 85 is shown secured to the leaf spring attachment part 76. Thrust washer 85 is annular shaped. The thrust washer 85 is preferably made from an ultra-high molecular weight polyethylene and is designed to absorb forces created by lateral movement of the leaf spring attachment part 76 and prevent that part from wearing on frame hanger 66 (FIG. 2). In a preferred embodiment, the leaf spring attachment part 76 is shown as being mounted to the distal end portion of single-leaf leaf spring 44 by the two fasteners 78, 80.

Referring now to FIGS. 4–6, the leaf spring attachment part 76 is shown to include the metal sleeve 84, along with an elastomeric force absorber 92, which may be made from rubber, and a housing 94, which may be a metal casting. The leaf spring attachment part 76 is sized and shaped so that the bore of metal sleeve 84 is coincident with the instant center of rotation 16 (FIG. 7) for the leaf spring 44 when the leaf spring is secured to frame hanger 66.

The housing 94 is mounted to the distal end portion 65 of single-leaf leaf spring 44 by the fasteners 78, 80. The elastomeric force absorber 92 is bonded to the housing 94 along the inner circumferential wall 96 of the housing. The elastomeric force absorber 92 includes two cavities 98, 100 preferably positioned on diametrically opposed fore-and-aft ends of the absorber. cavities 98, 100 soften and increase the flexibility of elastomeric force absorber 92. Cavities 98, 100 also provide the distal end portion 65 with a limited amount of longitudinal play to accommodate any tolerances attributable to leaf spring 44.

The elastomeric force absorber 92 is sized and shaped to accommodate and retain the metal sleeve 84. In this regard, the elastomeric force absorber 92 is preferably bonded to the metal sleeve 84. Metal sleeve 84 includes a bore 102 extending therethrough, which is sized and shaped to receive a rod, such as a pin or, as is shown in FIGS. 1 and 2, a pivot bolt 82. If a bolt, such as pivot bolt 82, is used to fasten and fix the position of metal sleeve 84 relative to frame hanger 66, when the distal end position 65 of the single-leaf leaf spring 44 pivots about its natural instant center of rotation the elastomeric force absorber 92 will be worked in shear. If, on the other hand, a clevis or pin is used to position and freely secure metal sleeve 84 relative to frame hanger 66, the metal sleeve will not be fixed relative to the frame hanger and will be free to spin, or pivot, about the clevis or pin, along with the other sub-parts of leaf spring attachment part 76, as the leaf spring is deflected.

Those skilled in the art will appreciate that the leaf spring attachment part 76 allows fore-and-aft, and vertical movement of the distal end portion 65 of single-leaf leaf spring 44 to its natural range of movement. In particular, the distal end portion 65 of single-leaf leaf spring 44 is permitted to pivot about its natural center of rotation while it maintains connection with frame member 50 through leaf spring attachment part 76 and frame hanger 66.

FIGS. 8–11 illustrate a second embodiment of a novel leaf spring attachment part designated 176 being fixedly mounted to the distal end portion 165 of a leaf spring 144, which is shown for illustrative purposes as a single-leaf leaf spring. Two fastener assemblies 178, 180, each comprising a nut and bolt, provide means for mounting the leaf spring attachment part 176 to the single-leaf leaf spring 144. The leaf spring attachment part 176 is preferably positioned between the depending panels of a frame hanger to connect a pivot bolt so that it extends along an axis coincident with the natural instant center of rotation for the leaf spring. As will be appreciated, a pin or clevis could alternatively be used.

The leaf spring attachment part 176 includes a metal sleeve 184, along with an elastomeric force absorber 192, which can be made from rubber, and a housing 194, which can be a metal casting. The leaf spring attachment part 176 is sized and shaped so that the bore of metal sleeve 184 is coincident with the instant center of rotation 16 (FIG. 7) for the leaf spring 144 when the leaf spring is secured to the frame hanger.

The housing 194 is mounted to the distal end portion 165 of single-leaf leaf spring 144 by the nut and bolt fastener assemblies 178, 180. The elastomeric force absorber 192 is bonded to the housing along the inner wall 196 of the housing. As shown, the inner wall 196 of the housing has relatively flat side walls and curved top and bottom walls. The elastomeric force absorber 192 includes two bores 198, 200 preferably positioned opposite each other on the fore-and-aft sides of the leaf spring attachment part 176. Bores 198, 200 soften and increase the flexibility of elastomeric force absorber 192 and accommodate tolerances. A thrust washer could preferably optionally be used to absorb forces created by lateral movement of the leaf spring attachment part 176 and prevent it from wearing on the frame hanger.

Figure 10:
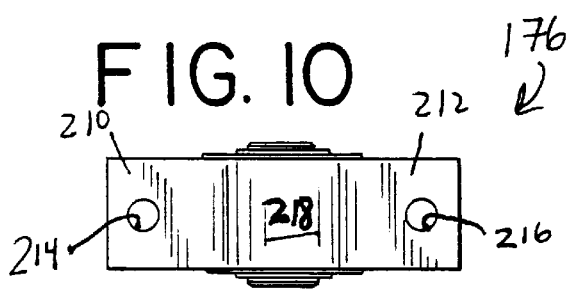
FIG. 10 is a top plan view of the novel component part illustrated in FIG. 8.
Figure 9:
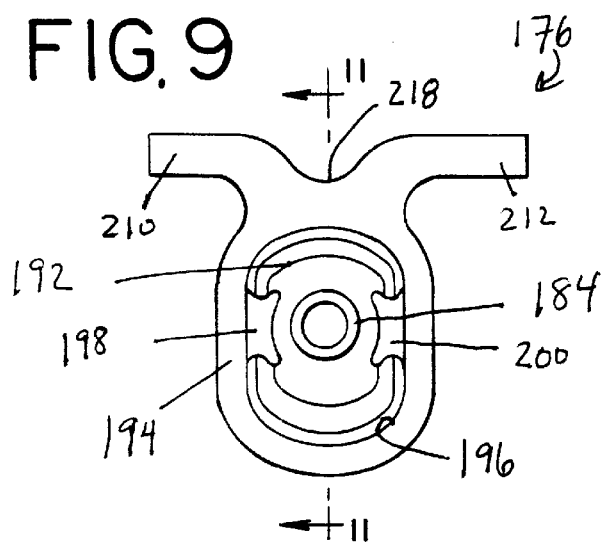
FIG. 9 is an elevational view of the novel component part illustrated in FIG. 8.
Figure 11:
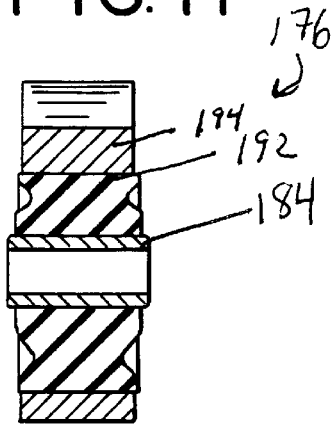
FIG. 11 is a sectional view of the novel component part illustrated in FIG. 8 taken along lines 11-11 of FIG. 9.

As best illustrated in FIGS. 9 and 10, leaf spring attachment part 176 includes two opposing fore-and-aft extending leaf spring mounting flanges 210, 212. The respective upper surfaces for mounting flanges 210, 212 are generally flat to permit mounting of attachment part 176 to the generally flat distal end portion of leaf spring 144. Each mounting flange 210, 212 has one of two bores 214, 216 extending through it to receive its associated fastener assembly 178, 180 and permit secure mounting of the leaf spring attachment part 176 to the distal end of the leaf spring 144. Leaf spring attachment part 176 also includes a central valley portion 218 extending between mounting flanges 210, 212 laterally across the top side of the leaf spring attachment part. Central valley portion 218 reduces the weight of leaf spring attachment part 176, which, in turn reduces the weight of the vehicle suspension system. As will be appreciated by those skilled in the art, in the case of commercial vehicles, this reduction of weight translates into greater payload capacity.

Although the present invention has been described by reference to certain prefered embodiments, it should be understood that those preferred embodiments are merely illustrative of the principles of the present invention. Therefore, modifications and/or changes may be made by those skilled in the art without departing from the true spirit and scope of the invention as defined by the appended claims.

What is claimed is:

1. A vehicle suspension system for supporting a vehicle frame, comprising:
   a leaf spring having a first end portion connecte to the vehicle frame and a second end portion connected to the vehicle frame;
   a leaf spring attachment part mounted to the first end portion of the leaf spring having a bore positioned at a natural center of rotation for the first end portion of the leaf spring;
   a rod extending through the bore of the leaf spring attachment part to connect the first end portion of the leaf spring to the vehicle frame;
   wherein the leaf spring attachment part has first and second opposing longitudinally and oppositely extending mounting flanges for attachment to the leaf spring.

2. The suspension system of claim 1 wherein the first mounting flange of the leaf spring attachment part has a bore extending through it and the second mounting flange of the leaf spring attachment part has a bore extending through it.

3. The suspension system of claim 2 further comprising a first fastener assembly having a first fastener assembly portion that extends through the bore of the first mounting flange of the leaf spring attachment part and a second fastener assembly having a second fastener assembly portion that extends though the bore of the second mounting flange of the leaf spring attachment part.

4. The suspension system of claim 1 wherein the leaf spring attachment part has a grooved central portion positioned between the first and second mounting flanges.

5. The suspension system of claim 4. wherein the grooved central portion extends laterally across the leaf spring attachment part.

6. A leaf spring attachment part for use with a leaf spring of the type used in a suspension system, comprising:
   a housing having a generally planar surface for attachment to the leaf spring;
   a force absorber secured to the housing; and
   a sleeve secured to the force absorber having a bore positioned generally coincident with a natural center of rotation for an end portion of the leaf spring when the leaf spring attachment part is mounted to the end portion of the leaf spring.

7. The leaf spring attachment part of claim 6 wherein the housing is metal.

8. The leaf spring attachment part of claim 6 herein the force absorber is elastomeric.

9. The leaf spring attachment part of claim 6 wherein the sleeve is metal.

10. The leaf spring attachment part of claim 6 wherein the force absorber is compliant.

11. The leaf spring attachment part of claim 6 wherein the force absorber has a bore that increases flexibility of the force absorber to permit the leaf spring attachment part to accommodate a tolerance attributable to the leaf spring.

12. A leaf spring attachment part for use with a leaf spring of the type used in a suspension system, comprising:
   a housing having first and second opposing longitudinally and oppositely extending mounting flanges for attachment to the leaf spring;

a force absorber secured to the housing; and a sleeve secured to the force absorber having a bore positioned generally coincident with a natural center of rotation for an end portion of the leaf spring when the leaf spring attachment part is mounted to the end portion of the leaf.

13. The leaf spring attachment part of claim 12 wherein the first mounting flange has a bore extending through it and the second mounting flange has a bore extending through it.

14. The leaf spring attachment part of claim 13 futher comprising a first fastner assembly having a first fastener assembly portion that extends through the bore of the first mounting flange and a second fastner assembly having a second fastner assembly portion that extends through the bore of the second mounting flange.

15. The leaf spring attachment part of claim 12 further comprising grooved central portion positioned between the first and second mounting flanges.

16. The leaf attachment part of claim 15 wherein the grooved central portion extends laterally across the leaf spring attachment part.

17. The leaf spring attachment part of claim 12 wherein the housing is a metal.

18. The leaf spring attachment part of claim 12 wherein the force absorber is elastomeric.

19. The leaf spring attachment part of claim 12 wherein the sleeve is metal.

20. The leaf spring attachment part of claim 12 wherein the force absorer is compliant.

21. The leaf spring attachment part of claim 13 wherein the force absorer has a bore that increases flexibility of the force absorber to permit the leaf spring attachment part to accommodate a tolerance attributable to the leaf spring.

* * * * *